(12) United States Patent  (10) Patent No.: US 9,272,689 B2
Fung et al.  (45) Date of Patent: Mar. 1, 2016

(54) SYSTEM AND METHOD FOR BIOMETRIC IDENTIFICATION IN A VEHICLE

(71) Applicant: Honda Motor Co., Ltd., Tokyo (JP)

(72) Inventors: Kin C. Fung, Dublin, OH (US); Timothy J. Dick, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 13/858,038

(22) Filed: Apr. 6, 2013

(65) Prior Publication Data

US 2014/0303899 A1    Oct. 9, 2014

(51) Int. Cl.
| | |
|---|---|
| *B60R 99/00* | (2009.01) |
| *G06F 7/00* | (2006.01) |
| *G06K 9/00* | (2006.01) |
| *G06F 19/00* | (2011.01) |
| *G07C 9/00* | (2006.01) |
| *B60R 25/25* | (2013.01) |

(52) U.S. Cl.
CPC ................ *B60R 99/00* (2013.01); *B60R 25/25* (2013.01); *G06F 19/36* (2013.01); *G06K 9/00536* (2013.01); *G07C 9/00158* (2013.01); *G06K 2009/00939* (2013.01)

(58) Field of Classification Search
CPC ............ B60R 99/00; G06F 19/36; G06F 7/00
USPC ................ 600/509, 508; 701/1; 382/115, 117
See application file for complete search history.

(56) References Cited

U.S. PATENT DOCUMENTS

| | | | |
|---|---|---|---|
| 5,719,950 A * | 2/1998 | Osten et al. | 382/115 |
| 6,198,996 B1 * | 3/2001 | Berstis | 701/36 |
| 6,271,745 B1 * | 8/2001 | Anzai et al. | 340/5.53 |
| 6,810,309 B2 | 10/2004 | Sadler et al. | |
| 6,993,378 B2 * | 1/2006 | Wiederhold et al. | 600/509 |
| 7,330,570 B2 * | 2/2008 | Sogo et al. | 382/115 |
| 7,403,804 B2 | 7/2008 | Ridder et al. | |
| 7,689,271 B1 | 3/2010 | Sullivan | |
| 7,756,558 B2 | 7/2010 | Ridder et al. | |
| 7,800,592 B2 | 9/2010 | Kerr et al. | |
| 7,946,483 B2 | 5/2011 | Miller et al. | |
| 7,948,361 B2 | 5/2011 | Bennett et al. | |
| 8,706,204 B2 * | 4/2014 | Seo et al. | A61B 5/0452 600/509 |
| 8,773,239 B2 | 7/2014 | Phillips et al. | |

(Continued)

FOREIGN PATENT DOCUMENTS

| | | |
|---|---|---|
| DE | 102005020847 | 11/2006 |
| DE | 102012208644 | 5/2013 |

(Continued)

OTHER PUBLICATIONS

Kaysaoğlu et al.: "A novel feature ranking algorithm for biometric recognition with PPG signals", Computers in Biology and Medicine vol. 49, 2014, pp. 1-14.

(Continued)

*Primary Examiner* — Nam V Nguyen
(74) *Attorney, Agent, or Firm* — Rankin, Hill & Clark LLP

(57) ABSTRACT

A computer implemented method for identifying a vehicle occupant including receiving a signal from a plurality of sensors, wherein the signal indicates a measurement of cardiac activity, determining a biomarker based on biometric features of the signal and identifying the vehicle occupant based on the biomarker.

16 Claims, 6 Drawing Sheets

(56) References Cited

U.S. PATENT DOCUMENTS

| | | | |
|---|---|---|---|
| 9,149,231 B2* | 10/2015 | Fujita | A61B 5/6892 |
| 2002/0097145 A1* | 7/2002 | Tumey | B60R 25/04 |
| | | | 340/426.28 |
| 2004/0088095 A1 | 5/2004 | Eberle et al. | |
| 2005/0155808 A1 | 7/2005 | Braeuchle et al. | |
| 2007/0159344 A1 | 7/2007 | Kisacanin | |
| 2008/0027337 A1* | 1/2008 | Dugan et al. | 600/508 |
| 2009/0054751 A1 | 2/2009 | Babashan et al. | |
| 2010/0113950 A1 | 5/2010 | Lin et al. | |
| 2011/0066042 A1* | 3/2011 | Pandia | A61B 5/029 |
| | | | 600/484 |
| 2012/0290215 A1 | 11/2012 | Adler et al. | |
| 2013/0172771 A1 | 7/2013 | Muhlsteff | |
| 2013/0245886 A1 | 9/2013 | Fung et al. | |
| 2014/0188770 A1 | 7/2014 | Agrafioti et al. | |
| 2014/0275854 A1* | 9/2014 | Venkatraman | A61B 5/721 |
| | | | 600/301 |

FOREIGN PATENT DOCUMENTS

| | | |
|---|---|---|
| DE | 102013200777 | 7/2014 |
| WO | 2011038803 | 4/2011 |

OTHER PUBLICATIONS

Murata et al.: "Noninvasive Biological Sensor System for Detection of Drunk Driving", IEEE Transactions on Information Technology in Biomedicine, vol. 15, No. 1, Jan. 2011.
TruTouch Technologies: "Technology Overview" pp. 1-4, printed Apr. 27, 2015.
Brown et al.: "Framework for Multivariate Selectivity Analysis, Part I: Theoretical and Practical Merits", Applied Spectroscopy, vol. 59, No. 6, 2005, pp. 787-803.
Ridder et al.: "Framework for Multivariate Selectivity Analysis, Part II: Experimental Applications", Applied Spectroscopy, vol. 59, No. 6, 2005, pp. 804-815.
Press Release: "Faurecia keeps travelers fit, healthier in a heartbeat with "Active Wellness" car seat", Apr. 20, 2015.
Press Release: "Hoana Partners with Automotive Seat Manufacturer Faurecia to Introduce "Active Wellness™" at Auto Shanghai 2015", Apr. 20, 2015.
YouTube Video Link: https://www.youtube.com/watch?feature=youtu.be&v=_1UBDFSzQ28&app=desktop, printed on Apr. 27, 2015.
Article: http://www.faurecia.cn/jian-kang-mai-bo-fo-ji-ya-active-wellness-zuo-yi-wei-jia-cheng-zhe-jian-kang-hu-hang, printed on Apr. 27, 2015.
TruTouch Technologies prototype, Driver Alcohol Detection System for Safety, www.DADSS.org, 1 page.
Search Report of DE Serial No. 10 2014 206 648.4 dated Nov. 26, 2014, 9 pages.
Search Report of DE Serial No. 10 2014 206 648.4 dated Nov. 26, 2014, 8 pages (English translation).
Internet Video: CEATEC new chip detects motion, heartbeats—Videos (news)—PC Advisor printed Jan. 17, 2012.
International Search Report and Written Opinion of PCT/US2015/037019 dated Nov. 2, 2015, 12 pages.

* cited by examiner

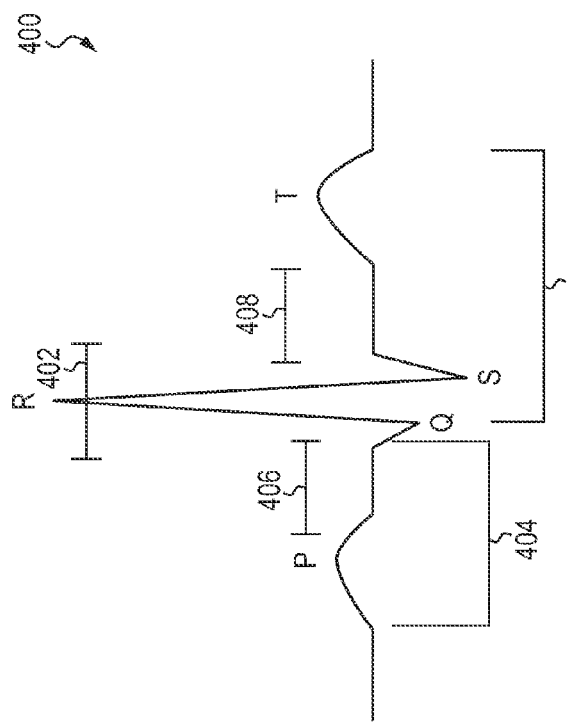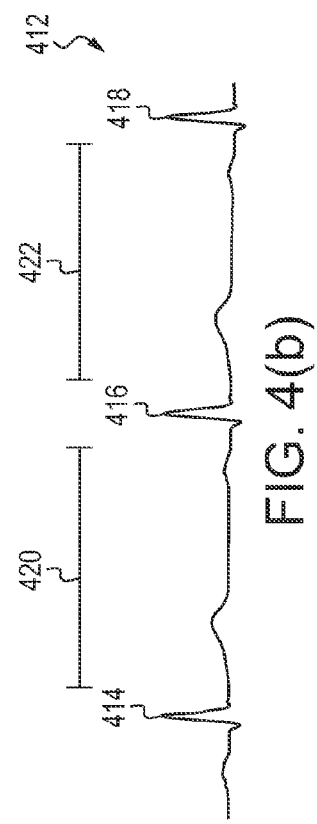

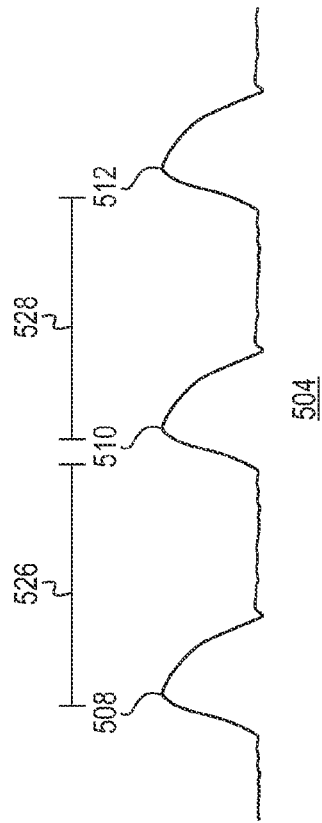
FIG. 5(a) 502
FIG. 5(b) 504
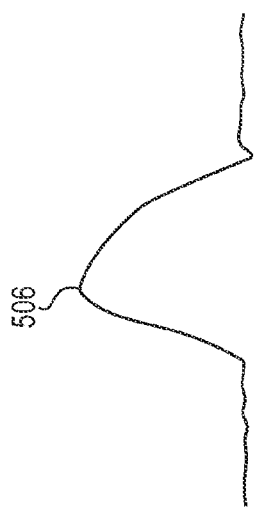
FIG. 5(c) 514
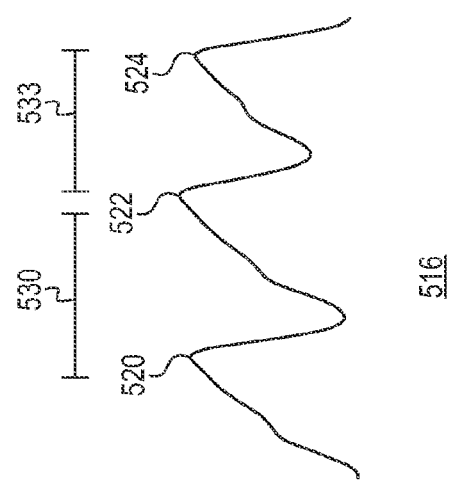
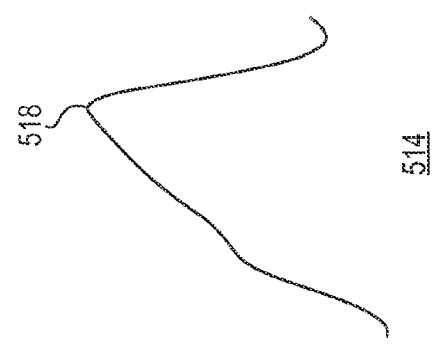
FIG. 5(d) 516

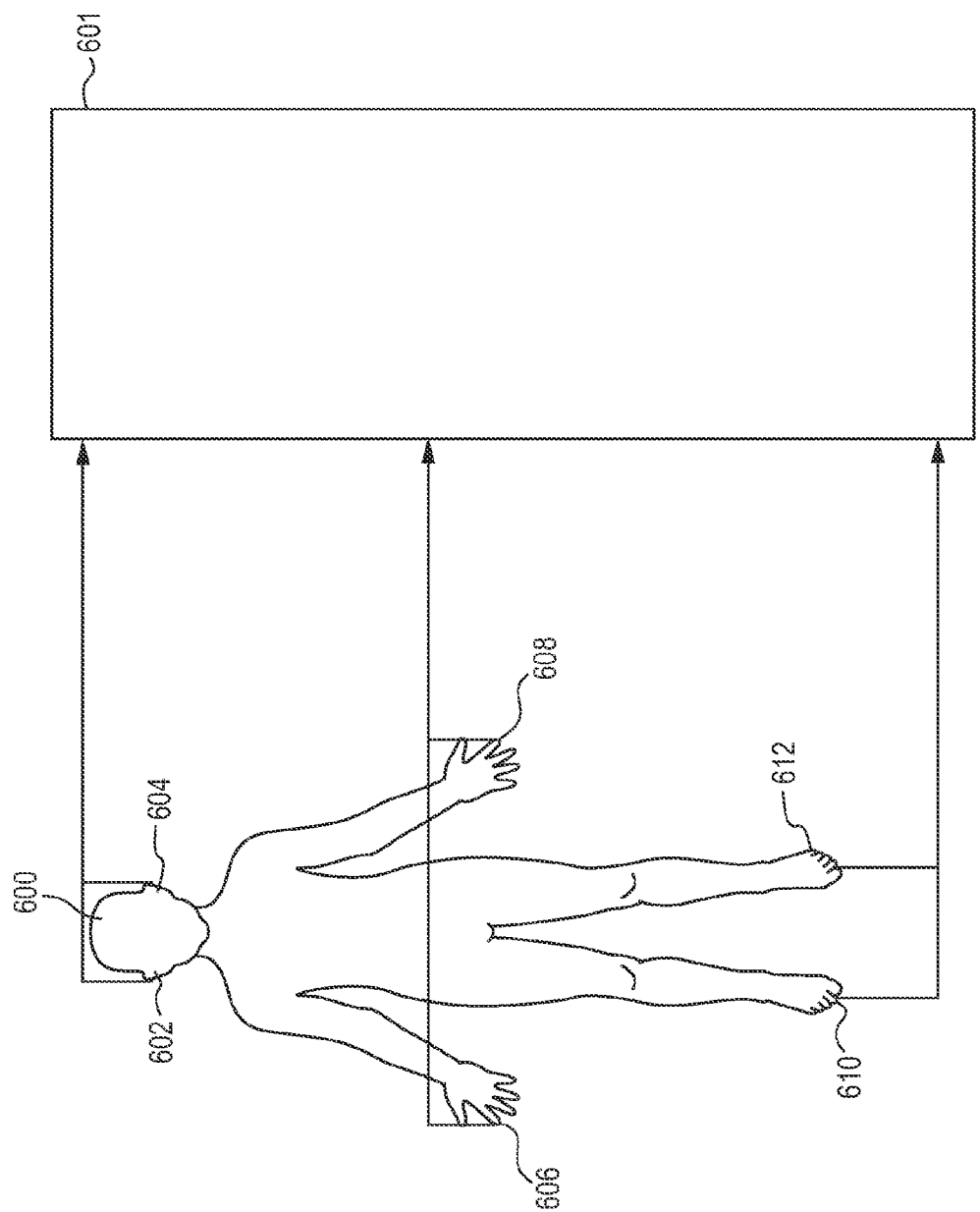

SYSTEM AND METHOD FOR BIOMETRIC IDENTIFICATION IN A VEHICLE

BACKGROUND

Motor vehicles utilize personal identification (i.e., driver and occupant identification) for various vehicle functions. For example, personal identification facilitates entry, access, activation, control personalization and modification of various vehicle systems and vehicle system data. Unique personal identification provides accurate and secure operation of said systems and data as well as a custom vehicle environment and tailored driving experience.

SUMMARY

According to one aspect, a computer implemented method for identifying a vehicle occupant includes receiving a signal from a plurality of sensors, wherein the signal indicates a measurement of cardiac activity, determining a biomarker based on biometric features of the signal and identifying the vehicle occupant based on the biomarker.

According to another aspect, a computer implemented method for detecting a driver identity includes receiving a cardiac signal produced from the driver and analyzing the signal for identifying features, determining the driver identity based on the identifying features and transmitting the driver identity to a vehicle system, wherein the vehicle system is modified based on the driver identity.

According to a further aspect, a system for personal identification in a vehicle includes a receiving module configured for receiving a signal from a plurality of sensors, wherein the signal indicates a measurement of cardiac activity, a biomarker module configured for determining a biomarker based on the biometric features of the signal, an identification module configured for identifying the vehicle occupant based on the biomarker.

BRIEF DESCRIPTION OF THE DRAWINGS

FIG. 4(a) is a schematic representation of a cardiac waveform of an electrical signal representing cardiac activity;

FIG. 4(b) is a schematic representation of a series of cardiac waveforms of FIG. 4(a);

FIG. 5(a) is a schematic representation of a cardiac waveform of an acoustic signal representing cardiac activity;

FIG. 5(b) is a schematic representation of a series of cardiac waveforms of FIG. 5(a);

FIG. 5(c) is a schematic representation of a cardiac waveform of an optical signal representing cardiac activity;

FIG. 5(d) is a schematic representation of a series of cardiac waveforms of FIG. 5(c); and FIG. 6 is a schematic view of locations on an individual for measuring cardiac activity.

DETAILED DESCRIPTION

Figure 1:
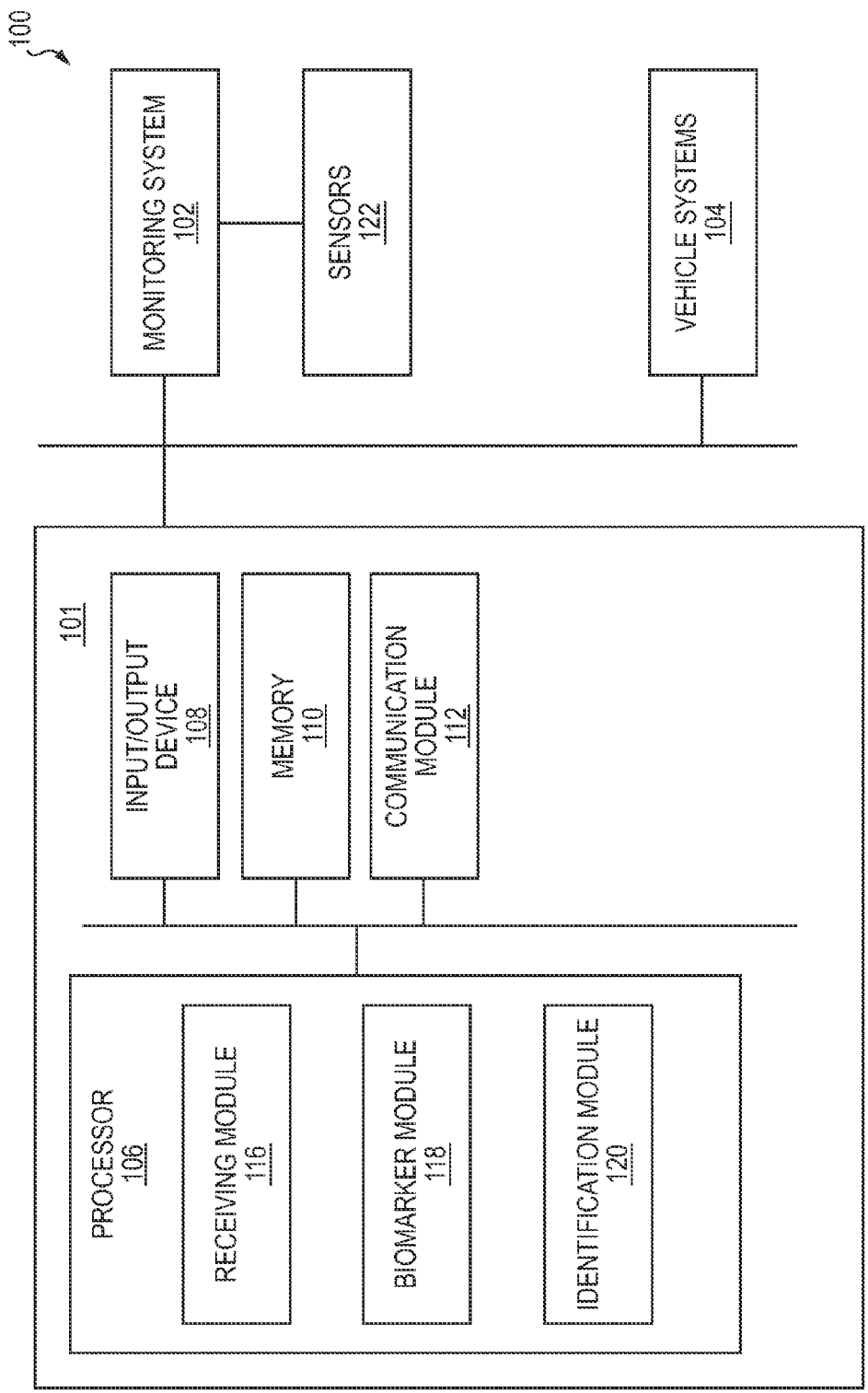
FIG. 1 is a schematic view of an illustrative computing environment for a computer system for personal identification in a vehicle according to an exemplary embodiment.

Referring now to the drawings, wherein the showings are for purposes of illustrating one or more exemplary embodiments and not for purposes of limiting same, FIG. 1 illustrates a computer system 100 for personal identification of an individual, specifically, of a vehicle occupant (e.g., a driver, one or more passengers). The computer system 100 includes a computing device 101 communicatively coupled to a monitoring system 102 and a plurality of vehicle systems 104. In the illustrated embodiment, the computing device 101 includes a processor 106, an input/output (I/O) device 108, a memory 110 and a communication module 112, each of which will be described in further detail herein. In some embodiments, one or more of the components of the system 100 may be combined, omitted or organized into different architectures. For example, the I/O device 108 can be organized into separate input and output devices, the memory 110 can be included with the processor 106 and so forth.

It is appreciated, that other components not shown in FIG. 1 (e.g., a display device, communication units/gateways, network buses), or several instances of the components shown in FIG. 1 can also be included. Additionally, although the aforementioned components, systems and methods are referred to herein with reference to the system 100 and FIG. 1, it is to be appreciated that one or more of the components of the system 100 can be associated with or incorporated into other devices. Other exemplary devices may include, but are not limited to, portable devices (e.g., a mobile phone, a laptop, a tablet or any other mobile device with computing functionality), a key fob, clothes, jewelry or other wearable devices, seats, chairs, beds, benches, couches, or other seating devices, automobiles, trucks, motorcycles, tractor trailers, tractors, lawn mowers, airplanes, boats, and other vehicles.

Figure 2:
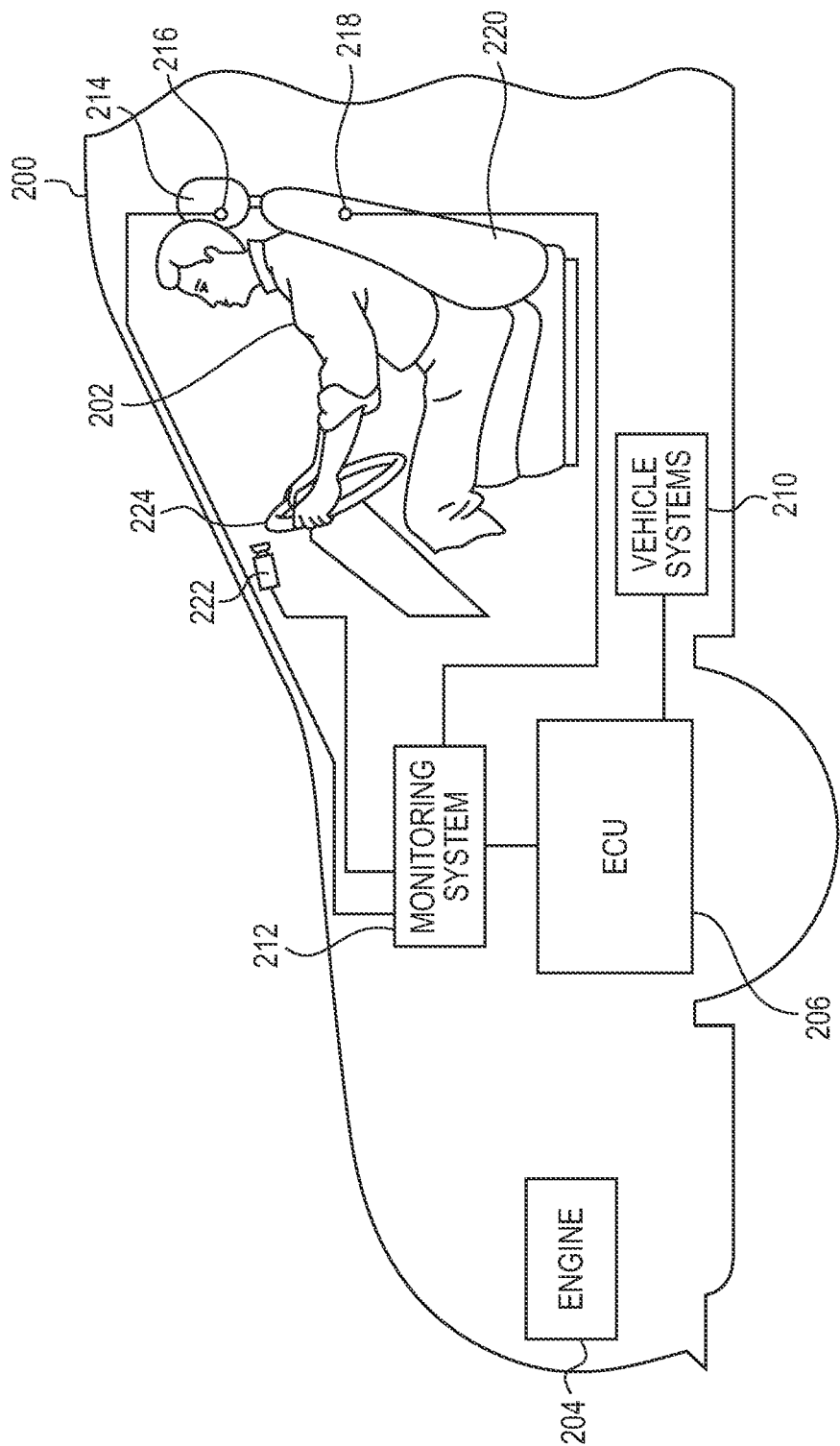
FIG. 2 is a schematic view of a motor vehicle for personal identification according to the exemplary embodiment of FIG. 1.

One exemplary embodiment is illustrated in FIG. 2, a motor vehicle 200 for identifying a vehicle occupant 202. The vehicle 200 can refer to any moving vehicle that is capable of carrying one or more human occupants and powered by a form of energy. The vehicle 200 includes an engine 204, an electronic control unit (ECU) 206, a plurality of vehicle systems 210 and a monitoring system 212, which can be the same or similar to the components of FIG. 1. It is appreciated that the components of the system 100, in whole or in part, can be integrated or associated with the vehicle 200. For example, components of the computing device 101 can be integrated with the ECU 206 located inside the vehicle 200. Similar to the computing device 101 of FIG. 1, the ECU 206 includes provisions for general computing and arithmetic functions as well as provisions for communicating and/or controlling various systems associated with the vehicle 200, the engine 204, the plurality of vehicle systems 210 and the monitoring system 212.

The monitoring system 212 can include and/or communicate with various sensors. Specifically, in FIG. 2, the sensors include a first sensor 216 in a headrest 214, a second sensor 218 in a seat 220. A steering wheel 224 may also include sensors (not shown) for identifying body state changes. Further, the monitoring system 212 can include and/or communicate with optical and image sensors, for example, a camera 222.

Exemplary vehicle systems 210 can include, but are not limited to, an ignition start control system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, an electronic power steering system, a climate control system, an infotainment system including visual devices, audio devices and tactile devices, among others. The vehicle systems 210 can also include data storage mechanism (e.g., memory) for storing data utilized by said vehicle systems, for example, sensitive data such as contact data, route data, password data, vehicle occupant profiles, driver behavior profiles, email, among others. As will be described in further detail below, the biometric identification systems and methods described herein can be utilized in conjunction with said vehicle systems to provide entry, access, activation, control and personalization or modification of said vehicle systems and associated data.

Referring again to FIG. 1, in the illustrated embodiment, the processor 106 processes signals and performs general computing and arithmetic functions. Signals processed by the processor 106 can include digital signals, data signals, computer instructions, processor instructions, messages, a bit, a bit stream, or other means that can be received, transmitted and/or detected. In particular, the processor 106 is configured to transmit, receive and process signals from the I/O device 108, the memory 110, the communication module 112, the monitoring system 102 and the vehicle systems 104. Generally, the processor 106 can be a variety of various processors including multiple single and multicore processors and co-processors and other multiple single and multicore processor and co-processor architectures.

The processor 106 further includes a receiving module 116, a biomarker module 118 and an identification module 120, which process signals and execute functions as described in further detail herein. Module, as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic, an analog circuit, a digital circuit, a programmed logic device, a memory device containing executing instructions, among others. A module may include one or more gates, combinations of gates, or other circuit components.

The I/O device 108 represents devices to provide input (e.g., user input) to the computing device 101 and to provide output from the computing device 101 (e.g., display images, data and other feedback, such as described herein). For example, input can be received though a cursor controller, a mouse, a keyboard, a touch screen and other mechanisms adapted to communicate information or command to the processor 106, the memory 110 or the communication module 112 through the computing device 101. Output devices can include a screen, a monitor, a touch screen, a navigation display, a screen of the portable device 108 or any other similarly equipped display devices, etc.

The memory 110 stores instructions and/or data executed and/or processed by the processor 106. The memory 110 can include one or more different types of memory for storing data temporarily, semi-permanently or permanently. For example, cache memory, Random Access Memory (RAM), Read-Only Memory (ROM), hard-drive, solid state drive, flash memory or any combination thereof. In one embodiment, the memory 110 can store a driver or a vehicle occupant profile including a stored biomarker which uniquely identifies the driver or the vehicle occupant.

The communication module 112 facilitates communication between the processor 106 and other components of computer system 100, other networks (e.g., the Internet, Wide Local Area Networks (WLAN)) and other systems, for example, the monitoring system 110. Communication can be enabled via wired, wireless or telecommunication protocol technologies known in the art. For example, communication can include a network transfer, a file transfer, an applet transfer, an email, an HTTP transfer, and so on. Communication can occur across, for example, a wireless system (e.g., IEEE 802.11), a Bluetooth system (e.g., IEEE 802.15.1), an Ethernet system (e.g., IEEE 802.3), a token ring system (e.g., IEEE 802.5), a LAN, a WAN, a point-to-point system, a circuit switching system, a packet switching system, among others.

The monitoring system 102 is configured to monitor and measure monitoring information associated with an individual and transmit the information to the computing device 101. The monitoring information can be used to determine biometric identification of a vehicle occupant and thereby control the vehicle (i.e., entry, access, activation, personalization and modification of vehicle systems) based on biometric identification. It is appreciated that the monitoring information and the biometric identification disclosed herein can be utilized with other systems associated with the vehicle and the vehicle occupant, including, but not limited to, vehicle systems 104, wellness and distraction systems or modifications of such systems based on the biometric identification.

The monitoring information as used herein can include physiological and environmental information related to the individual. Physiological information can include, but is not limited to, physical characteristics of the individual (e.g., posture, position, movement) and biological characteristics of the individual (e.g., cardiac activity, such as, heart rate, electrocardiogram (EKG), blood pressure, blood flow, oxygen content in the blood) and other biological systems of the individual (e.g., circulatory system, respiratory system, nervous system, including the autonomic nervous system, or other biological systems). Environmental information can include, but is not limited to, physical characteristics of the environment in proximity to the individual (e.g., light, temperature, weather, pressure, sounds). Environmental information can also include imaging information (e.g., from camera 222) of the individual (e.g., facial features, posture, etc.) and/or the environment in proximity to the individual and/or vehicle. It is appreciated that the above mentioned physiological and environmental information can be used alone or in combination for biometric identification of a vehicle occupant.

The monitoring system 102 can include any system configured to monitor and measure the monitoring information, such as, optical devices, thermal devices, autonomic monitoring devices (e.g., heart rate monitoring devices) as well as any other kinds of devices, sensors or systems. The monitoring device can also be incorporated with other types of devices, for example, portable devices (e.g., a mobile phone, a laptop, a tablet or any other mobile device with computing functionality), a key fob, clothes, jewelry or other wearable devices, seats, chairs, beds, benches, couches, or other seating devices, automobiles, trucks, motorcycles, tractor trailers, tractors, lawn mowers, airplanes, boats, and other vehicles.

In the illustrated embodiment, the monitoring system 102 includes a plurality of sensors 122 for monitoring and measuring the monitoring information. The sensors 122, as known in the art, sense a stimulus (e.g., a signal, property, measurement or quantity) using various sensor technologies and generate a data stream or signal representing the stimulus. The computing device 101 is capable of receiving the data stream or signal representing the stimulus directly from the sensors 122 or via the monitoring system 102. Although particular sensors are described herein, it will be appreciated by one having ordinary skill in the art that any type of suitable sensor can be utilized.

The sensors 122 can be contact sensors and/or contactless sensors and can include electric current/potential sensors (e.g., proximity, inductive, capacitive, electrostatic, electromagnetic, radio frequency), subsonic, sonic, and ultrasonic sensors, vibration sensors (e.g., piezoelectric) visual, photoelectric or oxygen sensors, among others. Contactless sensors are defined as devices that measure a stimulus of a subject without direct contact with a surface of the subject. As an example, a contactless sensor may sense a stimulus as a change in a field (e.g., magnetic, radio frequency), a displacement (linear, rotation, motion), a reflection of a signal (e.g., electric, sound, light) or an image (e.g., a camera) without direct contact with a subject being measured. On the other hand, contact sensors are defined as devices that measure a stimulus of a subject only upon direct contact with the surface of the subject.

Generally, the sensors 122 can be located in any position proximate to the individual or on the individual. Similar to the monitoring system 102, the sensors 122 can also be located in other devices, for example, a portable device as described above, a heart rate monitor, among others. The sensors 122 can generally be disposed in any portion of the vehicle. For example, in FIG. 2, the first sensor 216 and the second sensor 218 are located inside the headrest 214 and the seat 220 respectively of the vehicle 200. A sensor (not shown) could also be implemented in the steering wheel 224. In another embodiment, the sensors 122 could be located in a portable device. The vehicle 200 also includes a camera 222 for obtaining image and optical data of the vehicle occupant 202. It is to be understood that other devices and methods known in the art can be implemented to sense a biometric or physiological signal from an individual.

It is also appreciated that the sensors 122 can also include sensors associated with the vehicle systems 210 or from a vehicle bus (not shown), which sense and monitor vehicle operation data. Vehicle operation data is data related to vehicle systems and components and other types of data related to the operation and status of vehicle systems and components. Exemplary vehicle operation data can include, but is not limited to, vehicle speed, braking data, steering angles, steering torque, rotational speed, motor speed, wheel speed, vehicle location (e.g., GPS data, navigation system data) or vehicle diagnostic data.

In one embodiment, the monitoring system 102 and/or the sensors 122 can include a transceiver (not shown) for transmitting a signal towards a vehicle occupant and receiving a reflected signal after transmitting the signal from the vehicle occupant. The transceiver can include one or more antennas (not shown) to facilitate transmission of the signal and reception of the reflected signal. It is appreciated that a transceiver is optional and is not required in all embodiments to transmit and receive a signal or sense a signal. The sensors 122 are capable, as is known in the art, of transmitting and receiving said signals without a transceiver.

Figure 3:
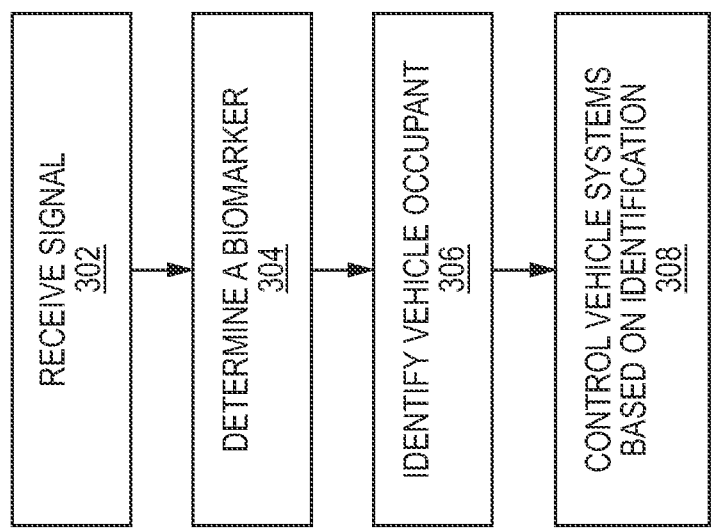
FIG. 3 is a process flow diagram of a method for identifying a vehicle occupant.

With reference to FIG. 3, a computer implemented method is shown for identifying a vehicle occupant (e.g., a driver 202 of FIG. 2). In different embodiments, the various steps of the method can be accomplished by one or more different systems, devices or components. In some cases, the steps may be accomplished by the processor 106 (FIG. 1) or the ECU 206 (FIG. 2). For each method discussed and illustrated in the figures, it will be understood that in some embodiments one or more of the steps could be optional. For purposes of reference, the method of FIG. 3 will be discussed with components shown in FIGS. 1 and 2. Moreover, cardiac activity or a measurement of cardiac activity, as used herein, refers to events related to the flow of blood, the pressure of blood, the sounds and/or the tactile palpations that occur from the beginning of one heart beat to the beginning of the next heart beat or the electrical activity of the heart (e.g., EKG).

At step 302, the method includes receiving a signal from a plurality of sensors. The signal can indicate a measurement of cardiac activity, for example, the signal can be a cardiac signal representing one or more of a heart beat or a heart rate of the vehicle occupant. In one embodiment, discussed in detail below, the method includes transmitting a signal towards the vehicle occupant and receiving a reflected signal, the reflected signal indicating a measurement of cardiac activity. It is appreciated that the monitoring system 102 can be configured to monitor cardiac activity of a vehicle occupant from the plurality of sensors 122 and facilitate transmission of signals to the computing device 101.

As discussed above, the sensors 122, as known in the art, sense a stimulus (e.g., a signal, property, measurement or quantity) using various sensor technologies and generate a data stream or signal representing the stimulus. Specifically, the data stream or signal representing the stimulus is transmitted from the sensors to the receiving module 116, directly or via the monitoring system 102.

Particular sensors will now be described in operation for sensing monitoring information, specifically, physiological information (e.g., a signal indicating a measurement of cardiac activity) and environmental information. Although specific sensors and methods of sensing are discussed herein, it will be appreciated that other sensors and methods of sensing can be implemented. The sensors 122 can be contact sensors and/or contactless sensors and can include electric current/potential sensors (e.g., proximity, inductive, capacitive, electrostatic, electromagnetic, radio frequency), subsonic, sonic, and ultrasonic sensors, vibration sensors (e.g., piezoelectric), visual, photoelectric or oxygen sensors, among others.

Electric current/potential sensors are configured to measure an amount or change in an electric current, electrical charge or an electric field. The electric potential sensors can be contact sensors or contactless sensors located on or in proximity to the individual. For example, in the embodiment illustrated in FIG. 2, the first sensor 216 and/or the second sensor 218 and/or the third sensor (not shown) disposed in the steering wheel 224 could be electric potential sensors. In one embodiment, a sensor can sense a change in an electric current or an electric field upon direct contact with a vehicle occupant's skin. In another embodiment, a sensor can sense a change in an electric field of vehicle occupant's body without direct contact to the vehicle occupant's skin. In a further embodiment, a sensor can transmit an electric signal and receive a reflected signal from a vehicle occupant without direct contact to the vehicle occupant's skin. In one example, the electric signal could be transmitted and received using radio frequencies or other transmission mediums known in the art.

Sonic sensors are configured to measure sound waves or vibration at frequencies below human auditory range (subsonic), at frequencies within human auditory range (sonic) or at frequencies above human auditory range (ultrasonic). In one embodiment, sonic sensors can measure sound waves or vibration generated by cardiac activity. In another embodiment, ultrasonic sensors generate high frequency sound waves and evaluate the echo received back by the sensor. Specifically, ultrasonic sensors can measure sounds or vibrations produced by the heart. For example, the ultrasonic sensors can generate sound waves towards the thoracic region (e.g., in front or back of chest area) of an individual and measure an echo received back by the sensor indicating cardiac activity.

Visual sensors provide image-based feedback and include machine vision systems, cameras (e.g., the camera 222, FIG. 2) and other optical sensors. Digital signals generated by the visual sensors include a sequence of images to be analyzed. In one embodiment, visual sensors can detect cardiac activity through pixel analysis of images. Specifically, pixel movement tracked in images of a vehicle occupant's face and/or body can be analyzed to determine breathing and/or heart rate. In a further embodiment, visual sensors can determine and extract facial feature information (e.g., facial feature data points to define a facial feature or a position in relation to other facial features. The facial feature information can also be used for biometric identification of the vehicle occupant.

Photoelectric sensors use optics and light (e.g., infrared) to detect a presence, a volume or a distance of an object. In one embodiment, the photoelectric sensors optically obtain a photoplethysmogram (PPG) of cardiac activity, which is a volumetric measurement of pulsatile blood flow. PPG measurements can be sensed at various locations on or near an individual's body using, for example, a pulse oximeter. FIG. 6 illustrates a schematic representation of an individual 600 and a PPG analysis computer 601. PPG measurements can be obtained from different locations of the individual 600, for example, a left ear 602, a right ear 604, a left hand/finger 606, a right hand/finger 608, a left foot/toe 610 and a right foot/toe 612. The measurements can be obtained by photoelectric sensors near or on the above mentioned locations and transmitted to the PPG analysis computer 601. The PPG analysis computer 601 includes provisions for analyzing the PPG measurements and comparing PPG measurements obtained from different locations of the individual 600. In some embodiments, the monitoring system 102 or the processor 106 of FIG. 1 can perform the functions of the PPG analysis computer 601.

The plurality of sensors 122 are operative to sense a biological characteristic (e.g., cardiac activity) of the vehicle occupant in the vehicle utilizing contact sensors, contactless sensors, or both contact and contactless sensors. As discussed above, in one embodiment, a sensor can receive a signal indicating a measurement of cardiac activity produced by the vehicle occupant upon direct contact of the sensor to the vehicle occupant. In another embodiment, a sensor can sense a field change (e.g., magnetic, radio frequency) and/or receive a signal (e.g., signal reflection) indicating a measurement of cardiac activity produced by the vehicle occupant without direct contact of the sensor to the vehicle occupant. In particular, the method for identifying a vehicle occupant can further include a sensor that produces a field or transmits a signal towards the vehicle occupant. The sensors can sense a change in the field produced by the vehicle occupant or receive a reflected signal produced by the vehicle occupant after the signal reflects from the vehicle occupant. Specifically, a sensor can be configured to transmit a signal towards a thoracic region (i.e., general chest and/or back area near the heart) of the vehicle occupant. The reflected signal can indicate cardiac activity, for example, a cardiac signal. Signal reflection and magnetic and/or electric field sensing sensor technology can be utilized with different types of signals and sensors, as discussed above, and include, but are not limited to, electric current/potential sensors and/or sonic sensors, among others.

In the illustrated embodiment, the receiving module 116 can be further configured to process the signal thereby generating a proxy of the signal in a particular form. It is appreciated that the sensors 122 or the monitoring system 110 can also perform processing functions. Processing can include amplification, mixing and filtering of the signal as well as other signal processing techniques known in the art. Processing can also include modifying or converting the signal into a form allowing identification of biometric features. For example, the signal can be processed into a cardiac waveform, an electrocardiograph (EKG) waveform or a proxy of an EKG waveform for identification analysis.

As discussed above, the sensors 122 generate a signal representing the stimulus measured. The signal and the signal features vary depending on the property (i.e., the physiological, biological or environmental characteristic) sensed, the type of sensor and the sensor technology. The following are exemplary cardiac waveforms (i.e., signals indicating a measurement of cardiac activity) with signal features reoccurring over a period of time. Although specific waveforms are disclosed with respect to cardiac activity, it will become apparent to one having ordinary skill in the art that the methods and systems disclosed herein, are applicable to waveforms and signals associated with other physiological or environment characteristics associated with individual for biometric identification of a vehicle occupant.

Referring now to FIG. 4(a), a cardiac waveform 400 of an electrical signal representing cardiac activity is illustrated. In particular, the cardiac waveform 400 represents an EKG waveform 400, which is a graphical representation of the electrical activity of a heart beat (i.e., one cardiac cycle). As is known in the art, and as shown in FIGS. 4(b) (i.e., a series of cardiac waveforms 412), it is to be appreciated that an EKG can include a plot of the variation of the electrical activity over a period of time (i.e., multiple cardiac cycles).

Each portion of a heartbeat produces a difference deflection on the EKG waveform 400. These deflections are recorded as a series of positive and negative waves, namely, waves P, Q, R, S and T. The Q, R and S waves comprise a QRS complex 402 which indicates rapid depolarization of the right and left heart ventricles. The P wave indicates atrial depolarization and the T wave indicates ventricular repolarization. Each wave can vary in duration, amplitude and form in different individuals. In FIG. 4(b) the R waves are indicated by the peaks 414, 416 and 418. These waves and wave characteristics, or a combination thereof, can be identified as signal features for biometric identification.

Other signal features include wave durations or intervals, namely, PR interval 404, PR segment 406, ST segment 408 and ST interval 410. The PR interval 404 is measured from the beginning of the P wave to the beginning of the QRS complex 402. The PR segment 406 connects the P wave and the QRS complex 402. The ST segment 408 connects the QRS complex and the T wave. The ST interval 410 is measured from the S wave to the T wave. It is to be appreciated that other intervals (e.g., QT interval) can be identified from the EKG waveform 400. Additionally, beat-to-beat intervals (i.e., intervals from one cycle feature to the next cycle feature), for example, an R-R interval (i.e., the interval between an R wave and the next R wave), may also be identified.

FIG. 5(a) illustrates another embodiment of a cardiac waveform 502 of an acoustic signal representing cardiac activity generated or processed from a sensor, for example, a sonic or vibrational sensor. In particular, the cardiac waveform 502 represents the sound of aortic blood flow. The cardiac waveform 502 can include signal features similar to the cardiac waveform 400. Exemplary signal features can include a peak 506 or another wave duration, peak, feature of the waveform 502. The signal feature can reoccur in the signal over a period of time. For example, FIG. 5(b) illustrates an acoustic signal 504 having a series of cardiac waveforms (i.e., the cardiac waveform 502) with a series of peaks 508, 510, 512. It is appreciated that other characteristics of the waveform 502 and/or the signal 504 can also be identified as a signal feature.

FIG. 5(c) illustrates a cardiac waveform 514 from an optical signal representing a measurement of cardiac activity. The optical signal can be a photoplethsymograph (PPG) signal generated from a photoelectric sensor or a PPG device. The cardiac waveform 514 is a PPG signal representing a measurement of pulsatile blood flow. The cardiac waveform 514 can include signal features similar to the cardiac waveform 400. Exemplary signal features can include a peak 518 or another wave duration, peak, feature of the waveform 514. The signal feature can reoccur in the signal over a period of time. For example, FIG. 5(d) illustrates an optical signal 516 having a series of cardiac waveforms (i.e., the cardiac waveform 514) with a series of peaks 520, 522, 524. It is appreciated that other characteristics of the waveform 514 and/or the signal 516 can also be identified as a signal feature.

Referring back to FIG. 3 and step 304, the method further includes determining a biomarker based on biometric features of the signal. The biometric features can include characteristics (i.e. signal features) analyzed, identified and/or extracted from the signal. The biomarker module 118 can be configured to determine the biomarker. For example, biometric features of the cardiac waveform 400 can include waves P, Q, R, S and T or a series of said waves. Other characteristics can include intervals, time duration of characteristics, wave amplitude among others. The biomarker uniquely identifies the vehicle occupant and can be any combination of biometric features extracted from the signal. The biomarker may include comparisons of one or more of a wave amplitude, form and duration as well as ratios of these features for one wave compared to another wave. The biomarker is a unique identification feature of a vehicle occupant and thereby provides ultra security and authorization when used in conjunction with vehicle systems described herein. It is appreciated that other information can be used alone or in combination with the biometric features of the signal to determine a biomarker. For example, other information can include, but is not limited to, the psychological and environmental information received and or monitored by the monitoring system 102. For example, facial feature extraction data (acquired by the camera 222).

Further, in the case where multiple cardiac waveforms are obtained for a vehicle occupant, analysis of the heartbeat over time (i.e., beat-to-beat analysis, heart rate variability) can be performed and used to obtain the biometric features and/or a biomarker. For example, heart rate variability analysis methods known in the art include time-domain methods, geometric methods, frequency-domain methods, non-linear methods and long term correlations. Different metrics can be derived using these methods. For example, a beat-to-beat standard deviation (SDNN), a square root of the mean squared difference of successive beat-to-beat intervals (RMSSD), a set of R-R intervals, among others.

At step 306, the method includes identifying the vehicle occupant. For example, the identification module 120 can compare the biomarker identified at step 304 to a stored biomarker in the memory 110 associated with the vehicle occupant. The biomarker may also be stored and accessed via the portable device 108. In another embodiment, the identification module 120 can identify the vehicle occupant by comparing the biometric features with stored biometric features stored in a personal identification profile associated with the vehicle occupant in the memory 110 or accessed via the communication module 112 (e.g., an external database via a network). The stored biometric features or the biomarker can be based on the signal and acquired prior to using the system for personal identification. For example, the biomarker module 118 can collect baseline metrics from the vehicle occupant during a vehicle learning mode. A biomarker or biometric features that uniquely identify the vehicle occupant, as discussed above, can be determined and stored in the memory 110 for future use with the above described methods and systems. For example, the biomarker module 118 can then save the biomarker in a personal identification profile associated with the vehicle occupant.

At step 308, the identification can be transmitted by the communication module 112 to one of the plurality of vehicle systems 104 and access, entry, activation, control, and personalization or modification of the vehicle systems 104 can be implemented based on the identification. In another embodiment, the communication module 112 can transmit the identification to an external database or to a portable device. In one exemplary use of biometric identification, entry to a vehicle (e.g., vehicle door lock/unlock) is granted to a driver based on the biometric identification. For example, the system 100, and in particular the computing device 101 and the monitoring system 102 and/or the sensors 112 can be integrated with a portable device or a key fob. The sensors 102 can detect a change in an electric field produced by the vehicle occupant indicating a measurement of cardiac activity (e.g., an EKG) via the key fob outside of the vehicle. In another embodiment, the sensors 102 in the key fob could transmit and receive a reflected signal from a driver in proximity to the portable device or the key fob outside of the vehicle. The computing device 101 can determine a biomarker based on the signal and identify the driver based on the biomarker as described above in relation to the method of FIG. 3. Once the identity of the driver is known, entry to the vehicle can be granted or denied (e.g., vehicle door lock/unlock).

Further, once an identification of the driver and/or vehicle occupant is determined, the identification can be utilized in conjunction with other vehicle systems for activation of said systems or personalization and modification of said systems. In one example, collision mitigation, braking systems, driver assistance systems and algorithms used therein, can be modified based on the identification to provide a tailored driving experience to the driver and/or the vehicle occupant. One having ordinary skill in the art will recognize that other vehicle systems and data associated with said vehicle systems can be controlled and/or operated based on the identification. Moreover, the identification could be transmitted to an application (i.e., a telematics application, a portable device application). Biometric identification, as discussed herein, provides a unique, accurate and secure measurement for entry, access, control, activation and personalization and modification of various vehicle systems and vehicle system data.

It will be appreciated that various modifications of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method for identifying a vehicle occupant, comprising:
transmitting an optical signal from a plurality of contract sensors located in a vehicle towards a thoracic region of the vehicle occupant;
receiving a reflected signal from the thoracic region of the vehicle occupant as a result of the optical signal reflecting from the vehicle occupant, wherein the reflected signal is an cardiac signal that indicates a measurement of cardiac activity;
determining a biomarker based on biometric features of the cardiac signal;
identifying the vehicle occupant based on the biomarker, wherein identifying the vehicle occupant includes comparing the biomarker to a stored biomarker; and
modifying a vehicle system based on identifying the vehicle occupant.

2. The method of claim 1, wherein the plurality of contactless sensors transmit and receive signals without direct contact between the sensor and the vehicle occupant.

3. The method of claim 1, wherein the measurement of cardiac activity is a cardiac waveform.

4. The method of claim 3, wherein determining the biomarker further includes extracting a P wave and a T wave of the cardiac waveform.

5. The computer implemented method of claim 1, wherein the plurality of contactless sensors located in the vehicle include photoelectric sensors and the optical signal indicates a photoplethysmogram of cardiac activity.

6. The computer implemented method of claim 1, wherein the plurality of contactless sensors located in the vehicle are located inside a seat of the vehicle.

7. A computer implemented method for identifying a vehicle occupant, comprising:
receiving an optical signal from one or more contactless sensors located in a vehicle, the optical signal being a cardiac signal produced from the vehicle occupant, wherein the optical signal is a reflected signal that is reflected from a thoracic region of the vehicle occupant;
analyzing a cardiac signal for identifying features;
identifying the vehicle occupant identity based on the identifying features, wherein the identifying the vehicle occupant identity includes comparing the identifying features to vehicle occupant identifying features that are stored in a vehicle occupant profile; and
transmitting the vehicle occupant identity to a vehicle system, wherein the vehicle system is modified based on the vehicle occupant identity.

8. The method of claim 7, wherein analyzing the cardiac signal further includes processing the cardiac signal to determine a cardiac waveform.

9. The method of claim 7, wherein the reflected signal is reflected from the vehicle occupant after transmitting a signal towards the thoracic region of the vehicle occupant.

10. The method of claim 7, wherein the vehicle occupant identity is used to determine vehicle personalization features of the vehicle system.

11. The computer implemented method of claim 7, wherein the one or more contactless sensors include one or more photoelectric sensors for sensing a photoplethysmogram of cardiac activity.

12. A system for personal identification in a vehicle, comprising:
A plurality of contactless sensor configured to transmit a signal towards a thoracic region of a vehicle occupant;
receiving module configured for receiving a reflected signal from a plurality of contactless sensors, wherein the reflected signal indicates a measurement of cardiac activity of the vehicle occupant, and wherein the contactless sensors optically obtain the signal;
a biomarker module configured for determining a biomarker based on biometric features of a cardiac signal; and
an identification module configured for identifying the vehicle occupant based on the biomarker, wherein the identification module identifies the vehicle occupant based on comparison of the biomarker features with stored biometric features and the vehicle modifies a vehicle system based on identifying the vehicle occupant.

13. The system of claim 12, wherein the measurement of cardiac activity is a cardiac waveform.

14. The system of claim 13, wherein the biometric features are at least one of a P wave or a T wave.

15. The system of claim 12, further comprising a memory for storing a personal identification profile with the stored biometric features associated with the vehicle occupant.

16. The system of claim 12, wherein the cardiac signal indicates a photoplethysmogram of cardiac activity.

* * * * *